(No Model.)
C. KUBACH.
AUTOMATIC VALVE FOR WATER TANKS.
No. 562,543. Patented June 23, 1896.
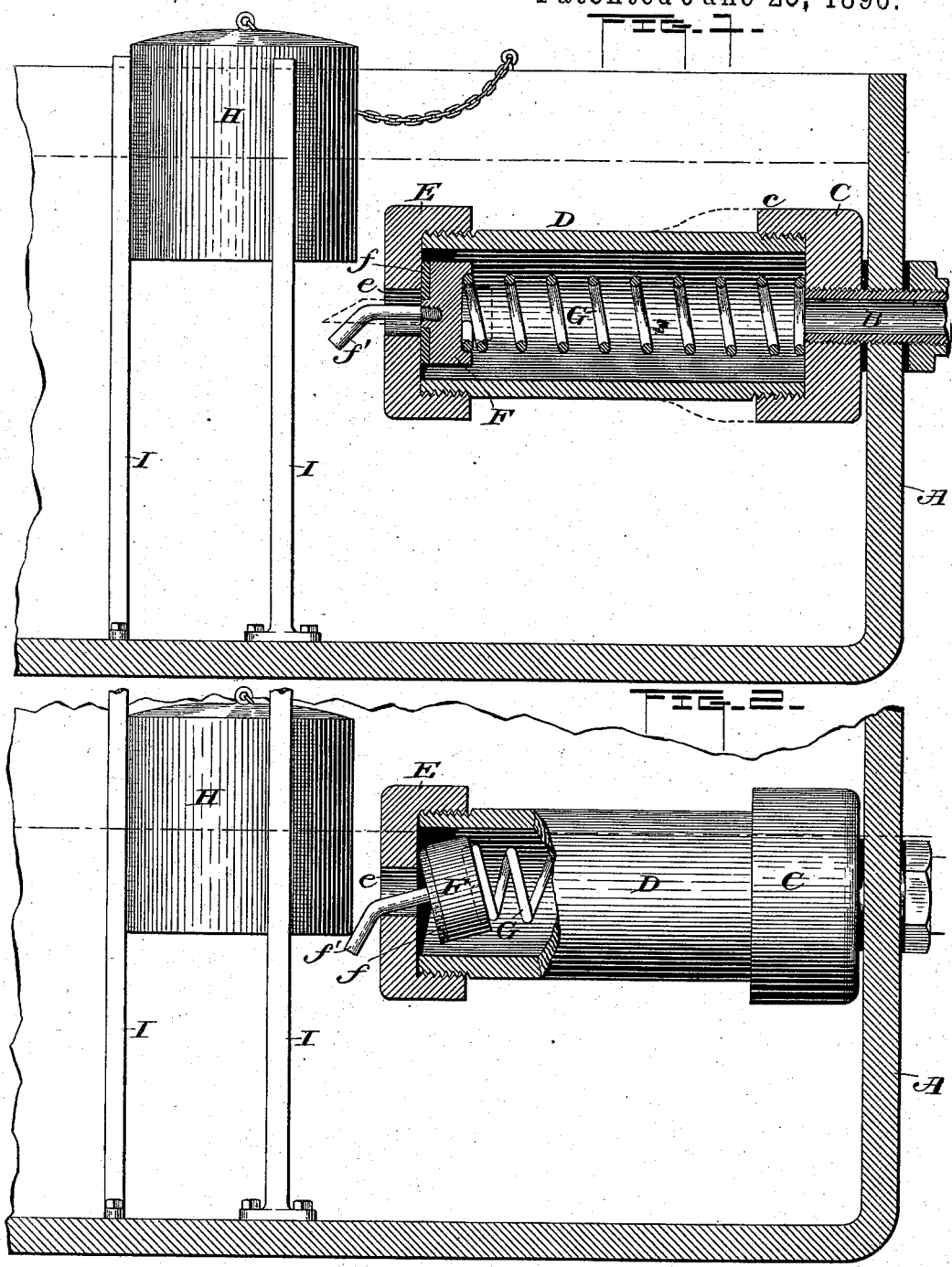
Witnesses
O. W. Smith
M. A. Dillon
Inventor
Charles Kubach,
By — Attorney

UNITED STATES PATENT OFFICE.

CHARLES KUBACH, OF ABILENE, KANSAS.

AUTOMATIC VALVE FOR WATER-TANKS.

SPECIFICATION forming part of Letters Patent No. 562,543, dated June 23, 1896.

Application filed December 9, 1895. Serial No. 571,539. (No model.)

*To all whom it may concern:*

Be it known that I, CHARLES KUBACH, a citizen of the United States, residing at Abilene, in the county of Dickinson and State of Kansas, have invented certain new and useful Improvements in Automatic Valves for Water-Tanks; and I do declare the following to be a full, clear, and exact description of the invention, such as will enable others skilled in the art to which it appertains to make and use the same, reference being had to the accompanying drawings, and to the letters of reference marked thereon, which form a part of this specification.

My invention relates to automatic valves for controlling the supply of water or other liquid to a tank, said valve being opened by a float when the water in the tank falls below a given level. Such valves are used in elevated water-tanks for domestic service, in water-troughs for stock, and the like.

In the drawings, Figure 1 is a sectional section of one end of a water-tank, showing my improved valve in sectional elevation. Fig. 2 shows the valve open.

Through the side of the tank A projects a pipe B, leading from any suitable source of supply. Secured to the end of said pipe preferably in a horizontal position is my valve having a casing composed, preferably, of a head C, through which the pipe passes, having a threaded flange $c$ for the attachment of a cylindrical body D, on the other end of which is a cap E, containing an opening $e$. The inner face of the cap is faced off to form a valve-seat. A valve F, preferably cylindrical and cup-shaped, is held against this seat by a helical spring G, which abuts at one end against said valve, and at the other end against the head C. The valve has an annular gasket or packing $f$. The stem $f'$ is rigidly secured to said valve and projects out through the opening $e$ in the cap E. The outer end of this stem is beveled, preferably by bending it down at an angle, as shown.

In the tank is a float H, arranged to rise and fall in close proximity to the valve and substantially at right angles to the longitudinal axis thereof, and to come in contact with the stem $f'$ when the level of the water falls below a given height. The float is preferably confined to a vertical path of movement by upright guides I, secured to the tank.

The operation of my device is as follows: When the level of the water falls to a predetermined point, the float comes in contact with the stem $f'$ of the valve and presses it downward, thereby canting the valve to one side against the pressure of the spring, and permitting the water to flow into the tank.

It will be observed that the float is not attached to the valve-stem in any way, and that the valve is not operated until the float comes in contact with the upper surface of the downwardly-bent portion of the stem, along which it slides as it crowds the stem downward and backward to open the valve.

It is evident that the construction of my device can be varied within certain limits without departing from the spirit of my invention. Thus the body D may be integral with the head C, and the valve may be rabbeted to receive the spring, instead of being cupped, as shown. The shape of the valve-seat may be varied, and the stem may be heavier and beveled off instead of being bent, all as indicated by dotted lines.

Having thus described my invention, what I claim, and desire to secure my Letters Patent, is—

The combination with a tank A, of a supply-pipe B entering said tank, a head C secured to the end of the pipe, a body D secured to the head C, a cap E secured upon the end of the body and having a central opening $e$, a loose valve F seated against the inner face of the cap, a helical spring G abutting between the valve and the head C, a valve-stem $f'$ rigidly secured to said valve and projecting out through the opening $e$, said stem having its outer end bent downwardly, a float H in the tank, and guides I causing said float to rise and fall adjacent to the cap E and to come in contact with the upper surface of the bent portion of the stem $f'$ to slide down the same and force back the valve from its seat, substantially as described.

In testimony whereof I affix my signature in presence of two witnesses.

CHARLES KUBACH.

Witnesses:
C. G. HAWK,
W. A. KERR.